United States Patent [19]

Bratland

[11] 3,716,377
[45] Feb. 13, 1973

[54] PREPARATION OF CHEESE
[76] Inventor: Arthur Bratland, Maudsvei 9, Heie, Notteroy, Norway
[22] Filed: Aug. 28, 1969
[21] Appl. No.: 853,940

[30] Foreign Application Priority Data

Sept. 3, 1968 Norway.............................3410/68

[52] U.S. Cl. ............................99/116, 99/62, 99/63
[51] Int. Cl..............................................A23c 19/02
[58] Field of Search..........................99/116, 115, 60

[56] References Cited

UNITED STATES PATENTS

| | | | |
|---|---|---|---|
| 3,278,313 | 10/1966 | Rhodes | 99/116 |
| 3,488,198 | 1/1970 | Bundus | 99/63 |
| 3,397,995 | 8/1968 | Elenbogen | 99/116 |
| 346,062 | 7/1886 | Oatman | 99/116 |

OTHER PUBLICATIONS

Lampert, L. M., Modern Dairy Products. Chemical Publ. Co., Inc., N.Y. 1965 (pages 199–200)
Webb, et al., Fundamentals of Dairy Chemistry. The Avi Publ. Co., Inc., Westport, Conn. 1965 (pages 31, 32 & 144)
McDowall, F. H., The Buttermakers Manual. New Zealand University Press, New Zealand, Vol. 2, 1953 (pages 1055, 1059 & 1060)
Norman G. H., Dried Buttermilk Improves Palatability of Reconstituted Milk. The Milk Products Journal. Vol. 46, No. 1 1955 (pp. 38–39)
Bratland, A. The Preparation of Reconstituted Milk or Cream. Chemical Abstracts. Vol. 65, 1966 (p. 19230g)

*Primary Examiner*—Lionel M. Shapiro
*Assistant Examiner*—David M. Naff
*Attorney*—Kenyon & Kenyon Reilly Carr & Chapin

[57] ABSTRACT

Cheese is made from an emulsion which contains a fat fraction including at least 25 percent non-milk fat, fat-free milk solids, butter serum and buttermilk.

5 Claims, No Drawings

PREPARATION OF CHEESE

This invention relates to foodstuffs and, in particular, to foodstuff intermediates suitable for the production of cheeses.

Cream substitutes made from animal or vegetable fats, skim milk and an emulsifier are generally known. For instance, in the U.S.A. whipping cream mixtures have been marketed in which a portion and preferably all the milk fat is replaced by vegetable fat. These products, which often include flavoring materials such as sugar and vanilla, are especially suitable for individuals having a high cholesterol count in the blood or who, for other reasons, have a low toleration of milk fat. Such diet foods are normally manufactured by mixing together the ingredients in the appropriate proportions and subjecting the mixture to light homogenization to avoid too rapid a separation of the fat.

Cheeses are usually made by processing a product comprising natural whole milk and/or cream and customarily have milk fat contents as high as 60 percent by weight. Thus, as in the case of cream substitutes, there is a real need to reduce the amount of milk fat in cheese without affecting the special characteristics thereof. Although the consistency of a cheese is governed largely by fat content, its flavor is influenced to at least as high a degree by the nature of the starting material.

It is an object of the present invention to provide novel intermediates from which cheeses can be produced of reduced milk fat content as compared with conventional cheese made from natural whole milk and/or cream.

It is another object of the invention to provide novel intermediates from which cheeses can be produced having a similar taste or flavor to those made from natural whole milk and/or cream.

According to the present invention an emulsion product suitable for producing cheese comprises up to 85 weight percent fat, of which fat at least 25 weight percent is non-milk fat, emulsified in a low fat milk fraction having a fat-free milk solids content of from 6 to 12 weight percent.

Also according to the invention are cheeses prepared from the aforesaid emulsion product.

More usually, the emulsion product contains a major proportion of non-milk fat and, if desired, the whole of the milk fat can be replaced.

In the preparation of the emulsion product, the fat is emulsified into the low fat fraction, preferably at an elevated temperature of, said, 50° to 60°C, by appropriate mechanical means, such as by circulation pumping with a centrifugal pump. In this way, an emulsion is obtained substantially without free fat. In a modified procedure in accordance with the invention, this emulsion can be separated into fat-rich and fat-poor fractions, the former fraction containing, for example, about 15 weight percent fat. The fat-rich fraction is then homogenized prior to being mixed together with the fat-poor fraction to form the emulsion product from which the cheese is to be made. A cheese according to the invention can be made from such emulsions using any of the procedures and equipment which are standard in the industry.

It is generally known that the milk fat in milk is present in the form of a large number of dispersed particles which are mainly spherical in shape. These particles are surrounded by certain materials which collect on their surfaces and maintain the particles dispersed in the aqueous phase. These materials which include albumins, globulins and phospholipoids such as lecithin and hephalin, thus form a boundary layer between the fat globules and the aqueous phase and microscopic examination of milk and cream has shown each fat particle to be enclosed by a membrane or film of such materials. Such membranes are unimolecular and their combined lipophilic and hydrophilic properties are believed to confer the relatively good stability which the fat emulsion of natural milk possesses.

An important aspect of the present invention is based upon the discovery that the taste or flavor of cheeses is governed only to a small extent by the type of fat they contain. What is considerably more significant is the composition of the membrane or film by which the fat globules of the starting material are bounded. Inasmuch as phospholipoids per se are unsatisfactory, a possible explanation is that complex compounds are formed between the former and milk proteins. Thus in manufacturing cheese substitutes, the composition of the membrane or film should be as similar as possible to that forming the boundary layer in natural milk or cream if the flavor of genuine cheese is to be achieved.

The term "low fat milk fraction" in this specification refers to a variety of extracts, including mixtures thereof, which can be separated from milk or from solid or liquid emulsions derived from milk, such as cream and butter, and which contain to varying extents the aforementioned membrane- or film-forming substances. Typical low fat milk fractions containing the membrane-forming substances are skim milk, buttermilk as well as various serums which can be extracted from milk, cream and butter by removing butter oil. Butter oil serums remaining after refining butter oil to higher degrees of purity provide additional important sources of these substances.

It will be appreciated that the quantity of membrane-forming substances present in a low fat milk fraction can vary over quite wide limits depending upon what the fraction is and the manner in which it has been prepared. For example, skim milk has a lower concentration of membrane-forming substances per unit volume than a cream separated from the original milk and hence buttermilk separated on churning that cream to butter has a concentration of membrane-forming substances per unit volume many times that of skim milk. In turn, a serum prepared form this butter has a concentration of membrane-forming substances several times that of buttermilk.

Furthermore, the higher the milk fat content of the cream, the higher the concentration of membrane-forming substances in the buttermilk extracted therefrom. Moreover, as the milk fat content of a skim milk increases so increases the amount of membrane-forming substances per unit volume.

It is usual to separate cream from milk at a temperature of from 40° to 45°C. However, experience has shown that as the temperature is increased, the concentration of membrane-forming substances in the cream decreases while that of the skim milk correspondingly increases.

The amount of membrane-forming substances present in the emulsion product of the invention is of real significance since too high a quantity prevents the separation of whey during cheese production while too little results in the separation of free fat.

At the same time, the fat-free milk solids content (sometimes referred to as the milk solid non-fat or MSNF content) of the low fat milk fraction is extremely important if a satisfactory cheese is to be obtained, a range of from 9 to 10 weight percent being found to be especially convenient, Generally speaking, a low fat milk fraction having a MSNF content exceeding 12 weight percent results in a cheese which is too dry, while with a MSNF value below 6 weight percent a fatty product is obtained having a consistency somewhat resembling that of mayonnaise.

An upper limit of 85 weight percent fat is specified above for the emulsion product since with fat contents exceeding this figure, a phase-exchange takes place from the desired fat-in-water emulsion to a water-in-fat emulsion. However, it is more usual to prepare the cheese from an emulsion containing from 3 to 5 weight percent emulsified fat, although fat contents as low as 0.03 weight percent have been used for certain cheeses. Emulsions of higher fat content can be readily diluted to this level by the addition of skim milk.

Non-milk fats which can be employed in producing the emulsion products of the present invention include vegetable and animal oils. Examples of such oils are cocoa nut oil, palm oil, cotton seed oil, ground nut oil, soya bean oil, olive oil, corn or maize oil, sunflower oil, whale oil and lard. Preferably, vegetable fat mixtures are used which melt between 25° to 35°C. Such a mixture can conveniently consist of liquid and solid soya bean oil and semi-solid sunflower oil. A mixture which has proved to be especially suitable in practice has soya bean oil and semi-solid sunflower oil present in respective amounts of from 30 to 40 weight percent and 25 to 35 weight percent with the balance being liquid soya bean oil.

Skim milk produced from natural milk by separating cream having a fat content range of from 20 to 40 percent by weight is a source of appreciable quantities of membrane-forming substances. However, skim milk which remains after separating, for example, a 35 percent cream (a cream containing about 35 weight percent milk fat) from natural whole mil, while possessing a satisfactory MSNF content, has per se too low a concentration of membrane-forming substances per unit volume for making most cheeses. For preparing suitable low fat milk fractions in which the fat can be emulsified, it has been found convenient to add to such a skim milk predetermined quantities of, for example, buttermilk and cream or butter serums as well as mixtures thereof. The proportions of the ingredients used in preparing the low fat milk fractions depend on their respective contents of membrane-forming materials and fat-free milk solids. Thus mere concentration of a skim milk to increase its membrane-forming material percentage can result in a MSNF percentage which is too high. However, since skim milk, buttermilk and cream and butter serums prepared from the same natural milk source have progressively lower MSNF contents, the addition to skim milk of one or other of the remaining fractions enables the proportion of membrane-forming materials in the resulting low fat milk fraction to be adjusted to the desired level without raising the overall MSNF percentage as compared with skim milk.

Suitable low fat milk fractions include those containing (a) skim milk and buttermilk in a ratio of from 2:1 to 1:2 by volume, (b) 10 to 20 volume percent butter serum with the balance being buttermilk, and (c) about 5 volume percent butter serum, 30 to 40 volume percent buttermilk with the balance being skim milk. The skim milk, in this instance, is that obtained by separating 20 to 40 percent cream from a natural milk containing, for example, 5 weight percent milk fat, the buttermilk that obtained by churning the 20 to 40 percent cream to butter and the butter serum that obtained by separating butter oil from the butter.

The butter serum is preferably separated from a non-acidified, unsalted butter, although for making certain cheeses an acidified, salted butter can be employed. This can be done quite simply by melting the butter and centrifuging out an aqueous lipoid fraction which constitutes the butter serum. The butter oil so obtained finds application as the fat raw material for use in recombining, a 99.5 percent pure butter fat being preferred because of its extreme durability, in contrast to butter, which turns rancid on storage.

Butter oil can also be separated from natural whole milk or cream by utilizing various special types of homogenizers or similar apparatuses which operate on a centrifugal principle. An example of such an apparatus is the "Clarifixator" manufactured by AB Separator of Sweden. A description of the apparatus is to be found in the article "From Idea to Product" appearing at page 15 to 22 of the 75th Jubilee Memorial Publication of the Association of Swedish Inventors, Stockholm 1961. By carefully selecting the operating conditions, butter oils can be readily removed at temperatures above 32°C, and preferably from 50° to 55°C, having varying degrees of purity from, say, 85 percent upwards. Moreover, a butter oil of, for example, 85 percent purity can be purified in this manner still further to a degree of purity close to 100 percent, leaving behind a butter oil serum having a concentration of membrane-forming substances similar to that of a butter serum, that is a serum obtained by separating butter oil from butter.

The components of the low fat milk fraction, as well as the fraction itself, can be utilized in a concentrated or dried condition provided appropriate quantities of water are added. Where sterilization is effected, it is necessary to replace the original cheese-forming bacteria destroyed thereby.

It is not customary to use buttermilk alone because it generally has too low a MSNF value. However, this difficulty can be overcome by concentration and/or the addition of buttermilk powder or skim milk powder. Moreover it has been found that where a buttermilk/skim milk mixture contains somewhat less than the desired content of membrane-forming materials, the emulsifying properties of the low fat milk fraction can be improved by simply adding a conventional emulsifier. Thus where the ratio of skim milk to buttermilk is of the order of 3:1 by volume, the skim milk being obtained from, for example, a 5 percent natural milk by separating a 20 to 40 percent cream and the buttermilk by churning this cream to butter, the addition of 0.2 weight percent of emulsifier results in a satisfactory low fat milk fraction.

Examples of emulsifiers which can be used in preparing the low fat milk fractions are the mono- or diglycerides of fatty acids such as monostearic and dipalmitic acid; polyoxyalkylene ethers of fatty acid esters of polyhydric alcohols such as polyoxyethylene ethers of sorbitan monostearate of polyoxyethylene ethers of sorbitan distearate; fatty acid esters of polyhydric alcohols such as sorbitan monostearate; mono- and diesters of glycols and fatty acids such as propylene glycol monostearate and propylene glycol monopalmitate; and partial esters of carboxylic acids such as lactic acid, citric acid and tartaric acid with mono- and diglycerides of fatty acids such as glycerol lactopalmitate and glyceryl lactooleate. Fatty acids which can be used in producing these emulsifiers include those which are extracted from beef tallow and cocoanut oil, cotton seed oil, palm oil, ground nut oil, soya bean oil and marine oils.

The emulsion product of the invention can also be made to incorporate vitamins which have a slight emulsifying effect. Cheeses have been made containing at least one of vitamins A to E with a total vitamin content of 20,000 units per kilogram.

While it will be readily appreciated that the primary purpose of the invention is to provide emulsion products from which novel cheeses can be prepared, these products also find useful application in the manufacture of icecream.

The invention will now be illustrated by the following Examples:

EXAMPLE 1

Natural whole milk having a fat content of 5 weight percent was pasteurized and thereafter treated in an homogenizer of the "Clarifixator" type operated at a speed of rotation of from 6,000 to 8,000 revolutions per minute, the milk being fed at about 1500 liters per hour which was roughly half the normal feeding speed. The temperature of the milk was maintained at 55°C and butter oil was separated having a degree of purity of 96.5 percent leaving behind a serum extract containing 0.5 weight percent fat and a milk solid non-fat (MSNF) content of 9.5 weight percent.

A vegetable fat mixture was prepared having a melting point of about 30°C and containing 35 weight percent solid soya bean oil (melting point 35°C) and 30 weight percent semi-solid sunflower oil, the balance being liquid soya bean oil. 3 kilograms of this fat mixture were added to 100 liters of the serum extract with stirring accompanied by heating to a temperature of 55°C whereby an emulsion with a pronounced whole milk taste or flavor was obtained having a fat content of 3.5 weight percent without free fat.

Rennin and a suitable cheese-forming culture were added to the emulsion and the mixture fermented and matured. A cheese was obtained having a fat content of 50 weight percent and a taste which could not be distinguished from cheese produced from conventional whole milk.

EXAMPLE 2

The procedure of the preceding Example was repeated but using instead a vegetable fat mixture based on palm oil having a melting point of about 30°C and containing solid, semi-solid and liquid palm oils. The emulsion and cheese products produced were similar to those obtained in Example 1.

EXAMPLE 3

Buttermilk having a fat content of 0.9 weight percent and a MSNF content of 8.5 weight percent was prepared by churning to butter a cream having a milk fat content of 35 weight percent, while skim milk having a fat content of 0.5 weight percent and a MSNF content of 9.5 weight percent was prepared from whole milk having a fat content of 5 weight percent.

50 liters of the buttermilk, 50 liters of the skim milk and 3.1 kilograms of the vegetable fat mixture of Example 1 were heated to 35°C and an emulsion containing 3.8 weight percent fat, without free fat, was produced by circulation pumping with a centrifugal pump.

The emulsion was separated into a fat-rich fraction containing about 15 weight percent fat and a fat-poor fraction. The fat-rich fraction was homogenized and thereafter after the two fractions were mixed together again by circulation pumping to form an emulsion having a similar fat content to the first-formed emulsion and a pronounced milk taste.

A cheese was produced as described in Example 1 having a 50 weight percent fat content and a taste which could not be distinguished from that of cheese produced from conventional whole milk.

EXAMPLE 4

The procedure of Example 3 was repeated but using instead the vegetable fat mixture based on palm oil of Example 2. The emulsion and cheese products produced were similar to those obtained in Example 3.

EXAMPLE 5

Cream having a milk fat content of 35 weight percent after first being pasteurized and subsequently heated to 55°C was fed to an homogenizer of the same type rotating at 800 revolutions per minute and under the same conditions as described in Example 1. Butter oil was separated having a degree of purity of 85 percent leaving a serum extract having a fat content of 1 weight percent and a MSNF content of 8.5 weight percent.

14 kilograms of the vegetable fat mixture of Example 1 was mixed into 100 liters of the afore-mentioned serum extract with stirring followed by heating to 55°C. An emulsion possessing a pronounced cream taste was obtained having a fat content of 3.5 weight percent.

A cheese was produced from the emulsion as described in Example 1 having a 50 weight percent fat content and a taste which could not be distinguished from that of cheese produced from conventional cream.

EXAMPLE 6

The procedure of Example 5 was repeated but using instead the vegetable fat mixture based on palm oil of Example 2. The emulsion and cheese products produced were similar to those obtained in Example 5.

EXAMPLE 7

Freshly churned, non-acidified and unsalted butter having a fat content of about 85 weight percent was centrifuged in a melted condition whereby butter oil containing 99.5 weight percent fat was separated leaving an aqueous serum fraction containing 1 weight percent fat.

50 liters of the aqueous serum fraction was mixed with 50 liters of skim milk having a fat content of 0.05 weight percent and a MSNF content of 9.5 weight percent and 5 kilograms of the vegetable fat mixture of Example 1. The mixture was stirred accompanied by heating to 55°C when an emulsion having a cream-like taste and a fat content of 5.2 weight percent was obtained.

A cheese was produced from the emulsion as described in Example 1 having a fat content of about 50 weight percent and a flavor which could not be distinguished from that of cheese produced from conventional cream.

EXAMPLE 8

The procedure of Example 7 was repeated but using instead the vegetable fat mixture based on palm oil of Example 2. The emulsion and cheese products produced were similar to those obtained in Example 7.

EXAMPLE 9

50 liters of skim milk having a fat content of 0.04 weight percent and a MSNF content of 9.5 weight percent and 50 liters of buttermilk having a fat content of 0.9 weight percent and a MSNF content of 8.5 weight percent were mixed with 7.35 kilograms of milk fat. The mixture was well stirred together at 40°C resulting in a product containing 7 weight percent fat without free fat. This product was introduced into an homogenizer of the same type as described in Example 1 and butter oil was separated under the same operating conditions leaving a serum extract containing 0.5 weight percent fat and a MSNF content of approximately 9 weight percent.

50 liters of the serum extract was stirred well together with 50 liters of buttermilk having a fat content of 0.9 weight percent and a MSNF content of 9.5 weight percent and 20 kilograms of the vegetable fat mixture of Example 1 at a temperature of 55°C. An emulsion was obtained having a fat content of 20 weight percent which was diluted with skim milk to a fat content of 4 weight percent without free fat and a MSNF content of 9.4 weight percent. The second emulsion had a pronounced cream-like flavor.

A cheese was produced from the second emulsion as described in Example 1 having a fat content of approximately 50 weight percent and a flavor which could not be distinguished from that of cheese produced from conventional cream.

EXAMPLE 10

The procedure of Example 9 was repeated but using instead the vegetable fat mixture based on palm oil of Example 2. The emulsion and cheese products produced were similar to those obtained in Example 9.

EXAMPLE 11

The procedure of Example 9 was repeated except that 0.25 kilogram of concentrated buttermilk and 0.25 kilogram of concentrated skim milk were added to the second emulsion to produce a final emulsion having approximately the same fat content and a MSNF content of 9.6 weight percent.

The afore-mentioned final emulsion was then mixed with the emulsions of Examples 1 and 3 in the ratio of 1:1:1 by volume.

A cheese was produced as described in Example 1 having a fat content of the order of 50 weight percent and a flavor which could not be distinguished from that of cheese produced from conventional cream.

EXAMPLE 12

The procedure of Example 11 was repeated but using instead the vegetable fat mixture based on palm oil of Example 2 to produce the final emulsion which was mixed with the emulsions of Examples 2 and 4 in the ratio of 1:1:1 by volume.

The cheese product and the emulsion from which it was made were similar to those of Example 11.

Although the cheeses resulting from the procedures disclosed in the preceding Examples all had a fat content of the order of 50 weight percent, it will be readily appreciated that cheeses may be produced in accordance with the invention having the wide variety of fat contents to be found in conventional cheeses.

What I claim is:

1. A method of making cheese consisting essentially of the steps of
    obtaining a fat fraction including a non-milk fat selected from the group consisting of animal and vegetable fat in an amount of at least 25 percent by weight of said fat fraction,
    obtaining a low fat milk fraction having a fat-free milk solids content of from 6 percent to 12 percent by weight of said milk fraction and a fat content of about 1 percent or less by weight of said milk fraction, said low fat fraction being selected from the group consisting of a mixture of butter serum and buttermilk with the butter serum constituting from 10 to 20 percent by volume of the mixture; and a mixture of butter serum, buttermilk and skimmilk with the butter serum constituting about 5 percent by volume of the mixture, the buttermilk constituting about 30 percent to 40 percent by volume of the mixture and the skimmilk constituting the rest of the mixture; said butter serum being obtained by centrifugally separating milk or cream to produce butter oil, or by melting butter to produce butter oil, and said butter milk being obtained by churning cream to produce butter.
    emulsifying said fat fraction in said low fat milk fraction in an amount sufficient to produce an emulsion product having a fat content of from about 3 percent to 85 percent by weight of the product;
    adding rennin and a cheese-forming culture to the emulsion product; and
    subsequently fermenting and maturing said emulsion product into a cheese.

2. A method as set forth in claim 1 wherein the emulsified fat contains a major proportion of non-milk fat.

3. A method as set forth in claim 1 wherein the low fat milk fraction has a fat-free milk solids content of from 9 to 10 percent by weight.

4. A process as set forth in claim 1 wherein the emulsion has a fat content of from 3 to 5 percent fat by weight.

5. A cheese made according to the method of claim 1 having a fat content of about 50 percent by weight, said fat content including at least 25 percent by weight of non-milk fat.

* * * * *